Patented Mar. 7, 1950

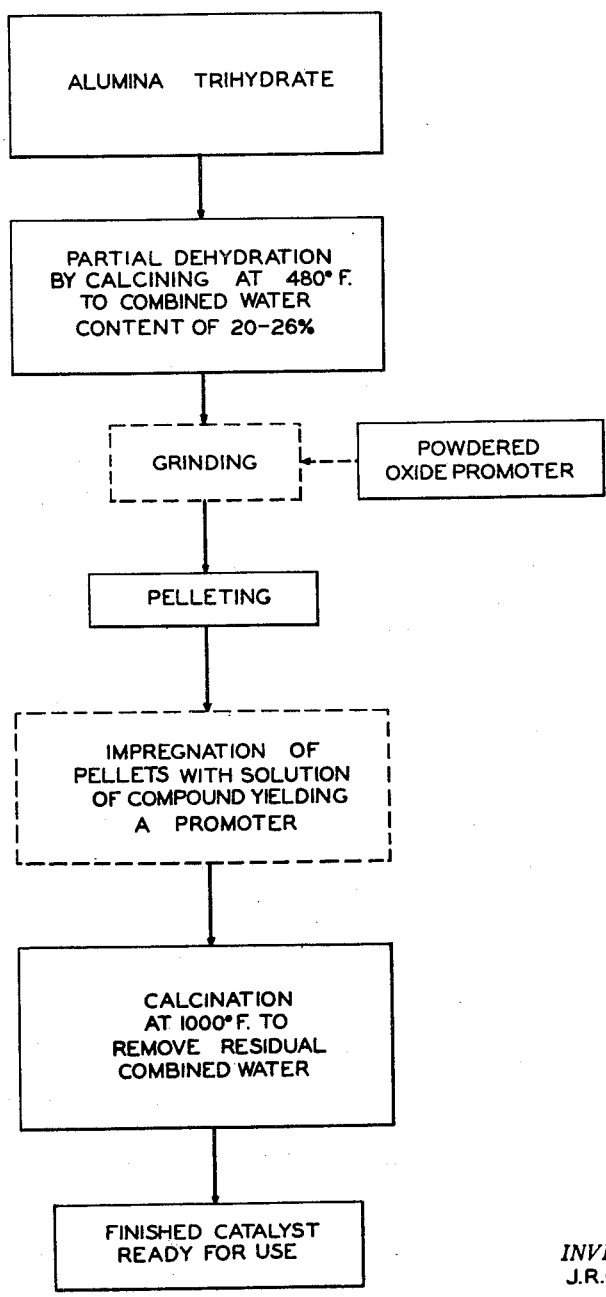

2,499,675

UNITED STATES PATENT OFFICE 2,499,675

PREPARATION OF PELLETED ALUMINA CATALYST

James R. Owen, Bartlesville, Okla., assignor to Phillips Petroleum Company, a corporation of Delaware Application December 13, 1945, Serial No. 634,767

9 Claims. (Cl. 252—465)

This invention relates to alumina catalysts and more particularly to an improved pelleted alumina catalyst and method of making the same. It also relates to an improved method of dehydrogenating by means of such a catalyst and especially to the dehydrogenation of aliphatic hydrocarbons to the corresponding (i. e. having the same number of carbon atoms and the same carbon skeleton) less saturated aliphatic hydrocarbons. For example paraffins may be dehydrogenated to the corresponding olefins, usually in admixture with a small proportion of the corresponding diolefin. Or aliphatic olefins may be dehydrogenated to the corresponding diolefins, usually conjugated. Thus the catalyst of the present invention is particularly applicable to effect the conversion of normal butane to a mixture of normal butenes and butadiene. For such a conversion the catalyst is preferably promoted with chromic oxide ($Cr_2O_3$, also known as chromium sesquioxide or as chromia). The alumina catalyst of the present invention is also very suitable for effecting the conversion of normal butenes to butadiene, especially when a minor proportion of magnesia is incorporated as a promoter during its manufacture.

The principal object of the present invention is to provide an improved alumina catalyst and method of making same. Another object is to provide an improved promoted alumina catalyst especially of the chromia-alumina type, i. e., containing a major proportion of alumina and a minor proportion, usually not over 10 per cent by weight, of chromic oxide. Another object is to provide catalysts as in the foregoing objects wherein the finished catalyst is in pelleted form and has an activity and a surface area markedly superior to that of similar pelleted catalysts available heretofore. Another object is to provide an improved method of dehydrogenation, especially of paraffins to olefins and/or diolefins and of olefins to diolefins.

Numerous other objects will hereinafter appear from a study of this specification and the claims appended thereto all taken in conjunction with the accompanying drawing which portrays diagrammatically one mode of making the catalysts of the present invention. Optional steps are indicated by means of dotted lines. The drawing is self-explanatory in the light of the following detailed description.

It is known that, in the preparation of activated alumina by dehydration of such materials as precipitated alumina gel and from minerals such as bauxite and gibbsite, the activity of the dehydrated alumina depends on proper control of the dehydration temperature. For example, alumina prepared by dehydrating bauxite at about 1000° F. is an active catalyst for dehydration, dehalogenation, dehydrogenation, etc., whereas anhydrous alumina prepared by dehydrating hydrous alumina above 2200° F. is comparatively inactive catalytically. Although the effect of dehydration temperature on activity of dehydrated alumina is not completely understood, it is believed that treatment at or above 2200° F. effects an intermolecular rearrangement the result of which is a form of alumina having a relatively low surface area per unit weight.

Commercially available activated alumina is often prepared by dehydrating minerals such as bauxite and gibbsite at about 1000° F. For example, alumina trihydrate is calcined to a moisture content of 8 to 10 per cent and then compressed into pellets, and the pellets are calcined to remove the balance of the combined water. Pelleted activated alumina prepared in this manner has a surface area of about 110 to 150 square meters per gram, measured by gas adsorption at low temperatures. In practice, the preparation process is usually not closely controlled; the chief control criterion is the suitability of the activated alumina for the intended use.

I have now found that a markedly superior alumina catalyst may be prepared by the steps of (1) calcining hydrated alumina containing at least 28 per cent by weight of combined water under conditions such that it is only partially dehydrated, namely to an extent such that the calcined material contains between 20 and 26 per cent of combined water, (2) compressing the resulting finely-divided material into pellets and (3) calcining the resulting pellets at a high temperature and under such conditions as to remove the residual combined water or water of hydration.

RAW MATERIAL FOR CATALYST PREPARATION

As the raw material for the manufacture of the catalyst of the present invention, I may use any suitable form of hydrated alumina containing 28 per cent by weight or more of combined water. The preferred raw material for making the catalyst of the present invention is that form of alumina trihydrate which is formed as a by-product in the Bayer or Fickes-Sherwin process for the precipitation of alumina from alkali aluminate aqueous solution. This material is formed as a scale on the precipitating tanks. It is obtainable from the Aluminum Company of America and is the raw material used in the manufacture of "Activated Alumina." For a more detailed description of this material, attention is directed to U. S. Patents to Barnitt 1,868,869 and Derr 2,015,593. This material has the chemical formula Al₂O₃·3H₂O and is very pure. It may be termed an artificial gibbsite.

Less preferably, I may employ naturally occurring materials such as those varieties of bauxite or gibbsite which contain combined water in the neighborhood of 28 to 35 per cent. Generally speaking such natural aluminas are believed to be of the trihydrate type, that is to contain a major proportion of alumina trihydrate, $$Al_2O_3 \cdot 3H_2O$$

However it is to be understood that the invention is not to be limited by any theoretical considerations and the principal criterion as to the suitability of the raw alumina is that it contain 28 per cent or more by weight of combined water. This figure is of course independent of any free water which can be removed readily by simple drying at say 220° F.

While I prefer to use alumina trihydrate obtained as a by-product in the manufacture of metallic aluminum, and may somewhat less preferably use naturally occurring alumina trihydrate such as bauxite or gibbsite containing 28 per cent or more of combined water, I do not wish to exclude from the present invention the use of synthetically prepared alumina trihydrate prepared for example by precipitation of alumina gel followed by drying to the trihydrate.

Whether by-product, natural or synthetically prepared, the hydrated alumina employed as raw material in carrying out the present invention is preferably in granular form. In size it may range from 100 mesh up to lumps as large as 4 to 5 inches. As received from the Aluminum Company of America, by-product alumina trihydrate formed as scale in precipitation tanks was of 40 to 100 mesh in size of particles. Apparently it had been ground prior to shipment. The size of the original material is not particularly critical as long as it is not so large that dehydration is not uniform due to difficulty of removing liberated water or to poor heat penetration into the interior of the granules during the relatively short partial dehydration step.

PARTIAL DEHYDRATION STEP

In the first step of making the catalyst, the hydrated alumina is heated under conditions controlled to produce partially dehydrated alumina which, when ignited to constant weight at about 2200° F., undergoes a weight loss of 20 to 26 per cent. In other words, the calcination is so controlled that the resulting material retains between 20 and 26 per cent of combined water. Since the weight loss on ignition is the chief control criterion in this step, the partial dehydration procedure may vary somewhat in different specific embodiments of the invention. It is preferred to conduct this step at a temperature of about 480° F. A temperature as low as 470° F. ranging to as high as 490° F. may be employed in this step. Rather close temperature control during this step is important since temperature rather than time is the principal factor in determining the extent of water removal. However it will be understood that other conditions including time are so adjusted that combined water is removed only to the extent specified.

Provision should be made for removing the water liberated during the partial dehydration step. If desired, the moisture may be removed as soon as formed by passing a current of gas over or through the material undergoing calcination. The natural draft in an ordinary rotary kiln is often adequate for this purpose.

In the case of by-product alumina trihydrate formed as scaly deposit in the precipitation tanks wherein alumina is precipitated from alkali aluminate solution, a preferred procedure comprises heating the material in a gas-fired rotary kiln at about 480° F.

While I do not wish to be limited by theoretical considerations, nevertheless it may be that the partial dehydration step serves to remove one molecule of combined water from the alumina trihydrate present in the starting material, thereby converting the alumina trihydrate content of the initial material to the dihydrate form. It will be understood that the original alumina trihydrate may contain a minor proportion of impurities so that even after drying to remove any free water it may not be 100 per cent pure alumina trihydrate. This may serve to explain why the partially dehydrated material may contain as low as 20 per cent of combined water whereas pure alumina dihydrate, Al₂O₃·2H₂O, would contain 26 per cent by weight of combined water. However it is to be understood that the present specification fully discloses the actual steps employed in the practice of the present invention and accordingly that the invention is not dependent upon the accuracy of the foregoing speculations. For instance, the existence of a compound having the formula Al₂O₃·2H₂O is subject to some doubt. Regardless of whether the compound alumina dihyrate exists or not, I have discovered that the steps outlined herein produce the results described and have given details sufficient to enable those skilled in the art to practice the invention.

Following the partial dehydrating step, the material is allowed to cool in any suitable way and is now ready for the second step. The cooling may be effected in any usual way, for example, by allowing it to stand in any suitable atmosphere until its heat has been dissipated. The cooling should be carried out in such a way that re-hydration of the material does not occur. Ordinary cooling does not cause such re-hydration.

PELLETING STEP

In the second step of the catalyst preparation the partially dehydrated alumina is compressed into pellets. This operation is well-known and need not be described in detail. It is variously known as pilling, pelleting or tableting. In essence it amounts to subjecting a suitable mass of powdered material to such high pressure that it retains its shape after release of the pressure and discharge from the pilling meachine. Pills or pellets of any desired shape or size can be manufactured. Usually however the pills are not larger than ¼ inch by ¼ inch.

FINAL CALCINATION

The pelleted alumina is then calcined under conditions such that the residual combined water is removed. While this may be done in any suitable way, I find it preferable to conduct this operation at a temperature ranging from 900° F. to 1200° F. In exceptional cases a temperature as high as 1300 F. may be employed, but results are not as satisfactory as when a temperature not over 1200° F. is employed. Temperatures ranging from 1200° F. to 1300° F. injure the catalytic activity of the material and preferably are avoided. Temperatures above 1300° F. are even more injurious and are never employed.

In a typical and preferred embodiment the pellets are calcined at about 1000° F., other conditions being such that the residual combined water is completely removed.

PELLETED ALUMINA PRODUCT

Pelleted alumina made in the foregoing manner is characterized by superior properties. It has a surface area of the order of 250 square meters per gram which is about twice that of activated alumina pellets hitherto commerically available which are made by dehydrating the alumina trihydrate to a combined water content of from 8 to 10 per cent, pelleting, and calcining the pellets to remove the rest of the combined water.

On account of the unusually large surface area and possibly for other reasons not yet known with certainty, pelleted alumina prepared in accordance with the process of the present invention is a superior catalyst, especially for the dehydrogenation of paraffins to the corresponding olefins and/or diolefins.

Alumina prepared in accordance with the present invention may be employed either directly as a catalyst or as a catalyst ingredient with improved results. Thus a promoter for the alumina may be incorporated in any suitable way during the manufacture of the pelleted alumina. Or the finished pellets may even be impregnated with a promoter or a compound convertible to a promoter. If desired other catalytic materials or materials convertible to catalysts may be incorporated during preparation of the pellets or even after preparation. Thus alumina prepared according to the principles of the present invention may be employed as a catalyst support.

Although activated alumina prepared in accordance with this invention is especially desirable as a dehydrogenation catalyst or as a component of a dehydrogenation catalyst, it is not limited thereto but may be used wherever activated alumina catalysts have been used heretofore. Thus it may be employed as a catalyst or catalyst ingredient for cracking, dehydration, polymerization, dehalogenation, cyclization and for any other catalytic processes where a superior activated alumina catalyst or catalyst component is desirable.

GRINDING STEP

In many cases the partially dehydrated material is ground before the pelleting step. This may be conducted in any suitable manner and equipment, for example in a ball mill. It is preferably a fine grinding operation. The grinding is carried out dry, that is without the addition of water. Provision may be made for recycling coarse particles to the grinding step for further grinding. The material leaving the grinding zone may be used directly in the pelleting step or may be sieved to any desired size, oversized particles being returned.

The extent of particle size reduction in the grinding step is variable within wide limits and depends primarily upon the particle size of the original material, the duration of the grinding and the particle size desired in the product. Purely as an example, where 40 to 100 mesh byproduct alumina trihydrate obtained from the Aluminum Company of America is used as the original material, the partially dehydrated material may be ground to an extent such that approximately one-third passes through a 300-mesh sieve. The material may be ground to any other suitable fineness such as 90 per cent through a 200-mesh sieve or 90 per cent through a 325-mesh screen.

GRINDING AND PELLETING LUBRICANT

If desired, a lubricant for the grinding and/or the pelleting operation may be introduced to the material to be ground or undergoing grinding. In the case of a lubricant added primarily for facilitating the pilling step, it may be added at any time sufficiently prior to the end of the grinding step that intimate incorporation is effected. When the lubricant is employed to facilitate the grinding step, it is preferably added ahead of the grinding step or in the early portion of this step. Example of suitable lubricants are graphite, hydrogenated oils such as hydrogenated corn oil, peanut oil, cottonseed oil, and the like, soaps such as aluminum stearate, etc., resins which may be natural or synthetic such as rosin, hydrogenated rosin, ester gum, polymerized rosin, etc. It is preferred to employ a lubricant which is destroyed during the calcination of the pellets. An advantage of organic compounds as lubricants is that they initiate binding forces upon calcination of the pilled or tableted material and thus impart strength to the finished catalyst so that breakage and dusting are minimized. Also the lubricant speeds up the grinding and pilling steps and prevents unduly rapid wear of the equipment employed for these steps. The amount of lubricant employed may vary from a trace up to approximately 10 weight per cent of the material being ground.

USE OF PROMOTER

It is often preferred to incorporate a promoter for the alumina during preparation of the pelleted alumina catalyst. A dry powdered promoter, or compound yielding a promoter upon final calcination, may be added before or during the grinding step as disclosed in my copending application Serial No. 607,884 filed July 30, 1945. Such a material may be admixed with the ground partially dehydrated alumina prior to the pelleting. For example, a promoter oxide such as chromic oxide and/or magnesia may be incorporated with the alumina prior to pelleting. Other promoters or compounds forming same upon calcination may be employed, such as magnesium hydroxide or carbonate, or beryllium oxide, hydroxide or carbonate. Other catalytic elements which may not function as promoters but rather as true catalysts may similarly be incorporated.

Alternatively, the pellets of alumina may be impregnated with a solution of a promoter such as an aqueous solution of chromium trioxide, or with a solution of any other substance desired to be incorporated in the finished catalyst. Upon calcination of the pellets in the third step of my process to remove the residual combined water, any water derived from the impregnating solution is removed and at the same time the chromium trioxide or other compound is converted to the form desired in the finished catalyst.

GENERAL

The alumina prepared according to the process of the present invention is entirely in the gamma form. No beta and no alpha alumina can be detected by X-ray analysis.

A possible partial explanation for the unexpectedly high surface area and catalytic activity of pelleted alumina prepared in accordance with the present invention is that by pilling the alumina when it is only partially dehydrated, the combined water serves as a cushion or space-filler in the pilling step so that upon complete dehydration of the pills, additional surface is formed with the result that the resulting pellets have much greater surface area than do pellets prepared by dehydration of alumina to a lower moisture content, then pilling, and then calcining to remove the residual water. This is by no means a complete explanation. Although it is the best explanation now known to me, it does not serve to explain why calcination to a combined water content of between 20 and 26 weight per cent is critical. It is to be understood that the invention is not limited by any such explanation.

DEHYDROGENATION PROCESS

The conditions of the dehydrogenation, namely, temperature, pressure, contact time and space velocity, are those commonly used in the art of dehydrogenation of aliphatic hydrocarbons to corresponding less saturated aliphatic hydrocarbons. These conditions do not per se form a part of my invention. Accordingly, it is unnecessary to detail conditions here. The dehydrogenation of my invention proceeds in exactly the same general manner as in the prior art except with higher production of the desired olefin and di-olefin, greater efficiency and greater retention of catalytic activity. The usual cycle of on-stream operation followed by conventional regeneration for approximately an equal period is employed.

Examples

Following are non-limiting specific examples of the practice of the invention. In Example II the surface areas were measured by the low-temperature gas adsorption method of Brunauer, Emmett and Teller, as described for example in J. A. C. S. 60, 309 (1938).

Example I

Granular alumina trihydrate as received from the Aluminum Company of America, made as a by-product in the manufacture of metallic aluminum and having a size of 40 to 100 mesh, was partially dehydrated by heating in a gas-fired rotary kiln. A weighed sample of the partially dehydrated material when ignited to constant weight at about 2200° F. underwent a weight loss of approximately 23 per cent. This material was ground so that approximately one-third passed through a 300-mesh screen. It was then compressed into pellets of the usual size and shape employed in catalytic operations. The pellets were immersed in an aqueous solution of chromium trioxide. They were then removed from the solution and heated at about 1000° F. for several hours to effect complete removal of both free and combined water. The catalyst so prepared contained 90 weight per cent alumina and 10 weight per cent chromia.

Normal butane was contacted, in a dehydrogenation system at 1100° F. and a space velocity of 500 gaseous volumes per volume of catalyst per hour, with the catalyst prepared as described above. The yield of normal butenes plus butadiene per pass was approximately 40 per cent.

A second catalyst was prepared by a method which was identical to that described above with the exception that commercially available pellets of activated alumina were substituted for the activated alumina prepared according to this invention. When the second catalyst was used in the normal butane dehydrogenation system under the conditions previously specified, the yield of normal butenes plus butadiene per pass was only 32 per cent.

Example II

Alumina trihydrate, as in Example I, was partially dehydrated by heating in a gas-fired rotary kiln. A weighed sample of the partially dehydrated alumina, when ignited to constant weight at 2200° F., underwent a weight loss of approximately 23 per cent. The partially dehydrated alumina was then finely ground and was formed into pellets, which were subsequently heated at 1000° F. for 3 hours. The activated alumina pellets obtained by this procedure had a surface area of 239.0 square meters per gram, determined by low-temperature gas adsorption.

The surface areas of two different samples of commercial activated alumina pellets were measured by low-temperature gas adsorption. The first had a surface area of only 161.5 square meters per gram; the second, an area of only 112 square meters per gram.

I claim:

1. The improved process of making a pelleted alumina catalyst which comprises calcining hydrated alumina containing at least 28 per cent of combined water at a temperature of from 470 to 490° F. under conditions such that the resulting material when ignited to constant weight at about 2200° F. undergoes a weight loss ranging from 20 to 26 per cent, compressing the resulting material into pellets, and calcining said pellets under such conditions as to remove the residual water of hydration.

2. The improved process of making a pelleted alumina catalyst from alumina trihydrate formed as a by-product in the precipitation of alumina from an alkali aluminate solution which comprises calcining said alumina trihydrate at a temperature of from 470 to 490° F. under conditions such that the resulting material when ignited to constant weight at about 2200° F. undergoes a weight loss ranging from 20 to 26 per cent, compressing the resulting material into pellets, and calcining said pellets under such conditions as to remove the residual water of hydration.

3. The improved process of making a pelleted alumina catalyst which comprises calcining granular bauxite containing at least 28 per cent of combined water at a temperature of from 470 to 490° F. under conditions such that the resulting material when ignited to constant weight at about 2200° F. undergoes a weight loss ranging from 20 to 26 per cent, compressing the resulting material into pellets, and calcining said pellets under such conditions as to remove residual water of hydration.

4. The improved process of making a pelleted alumina catalyst which comprises calcining alumina trihydrate at a temperature of about 480° F. for a period of time of from 1 to 3 hours and thereby partially dehydrating same to an extent such that the resulting material when ignited to constant weight at about 2200° F. undergoes a weight loss ranging from 20 to 26 per cent, finely grinding the resulting material, compressing the resulting finely ground material into pellets, and calcining said pellets at a temperature of about 1000° F. under such conditions as to remove the residual water of hydration.

5. The improved process of making a pelleted alumina catalyst which comprises calcining hydrated alumina containing at least 28 per cent of combined water at a temperature of from 470 to 490° F. under conditions such that the resulting material when ignited to constant weight at about 2200° F. undergoes a weight loss ranging from 20 to 26 per cent, compressing the resulting material into pellets, and calcining said pellets at a temperature ranging from 900 to 1200° F. under such conditions as to remove residual water of hydration.

6. The process of claim 1 wherein a promoter for said alumina is incorporated in the catalyst during its manufacture.

7. The improved process of making a pelleted chromia-alumina catalyst which comprises calcining hydrated alumina containing at least 28 per cent of combined water at a temperature in the range of 470 to 490° F. so that the resulting material when ignited to constant weight at about 2200° F. undergoes a weight loss ranging from 20 to 26 per cent, finely grinding the resulting material, incorporating a minor proportion of chromic oxide in dry powdered form with the material prior to completion of said grinding step, compressing the resulting finely ground material into pellets and calcining said pellets under such conditions as to remove the residual combined water.

8. The improved process of making a pelleted catalyst of alumina promoted with chromic oxide which comprises calcining hydrated alumina containing at least 28 per cent of combined water at a temperature of from 470 to 490° F. under conditions such that the resulting material when ignited to constant weight at about 2200° F. undergoes a weight loss ranging from 20 to 26 per cent, finely grinding the resulting material, compressing the resulting finely divided material into pellets, impregnating said pellets with an aqueous solution of chromium trioxide, and calcining said impregnated pellets at a temperature ranging from 900 to 1200° F. under such conditions as to remove the residual combined water.

9. A process for preparing alumina pellets from hydrated alumina containing at least 28 per cent water of hydration which comprises calcining the hydrated alumina at a temperature in the range of 470 to 490° F. so as to dehydrate said alumina to a combined water content in the range of 20 to 26 per cent by weight as determined by loss of weight upon ignition of the alumina to constant weight at a temperature of 2200° F., compressing the resulting partially dehydrated alumina into pellets, and calcining the pellets under such conditions as to remove residual water of hydration.

JAMES R. OWEN.

REFERENCES CITED

The following references are of record in the file of this patent:

UNITED STATES PATENTS

| Number | Name | Date |
|---|---|---|
| 1,920,246 | Daudt | Aug. 1, 1933 |
| 2,167,650 | Grosse | Aug. 1, 1939 |
| 2,217,865 | Groll et al. | Oct. 15, 1940 |
| 2,283,174 | Bates et al. | May 19, 1942 |
| 2,296,406 | Spicer et al. | Sept. 22, 1942 |
| 2,311,979 | Corson et al. | Feb. 23, 1943 |
| 2,415,061 | De Simo et al. | Jan. 28, 1947 |